United States Patent [19]
O'Neill

[11] 3,747,396
[45] July 24, 1973

[54] LINEARIZING CIRCUIT FOR A RAMP GENERATOR IN A DIFFERENTIAL SCANNING CALORIMETER

[75] Inventor: Michael J. O'Neill, West Redding, Conn.

[73] Assignee: The Perkin-Elmer Corporation, Norwalk, Conn.

[22] Filed: July 9, 1971

[21] Appl. No.: 161,024

[52] U.S. Cl. .................................. 73/15 B, 328/184
[51] Int. Cl. ............................................. G01n 25/00
[58] Field of Search ................ 73/15; 219/501, 494; 328/184

[56] References Cited
UNITED STATES PATENTS

| | | | |
|---|---|---|---|
| 3,629,721 | 12/1971 | Fordyce et al. | 330/107 |
| 3,263,484 | 8/1966 | Watson et al. | 73/15 |
| 3,628,129 | 12/1971 | Riley | 323/100 |
| 2,713,651 | 7/1955 | Coffey | 328/184 |
| 2,652,490 | 9/1953 | Levy | 328/184 |

Primary Examiner—Herbert Goldstein
Attorney—Edward R. Hyde, Jr.

[57] ABSTRACT

An electrical ramp signal provides a programmed increase or decrease of energy applied to a sample and a reference material. The ramp signal, which may, for example, be derived from a potentiometer or the like, provides a scanning range of setpoint temperatures to which a sample and a reference material are heated. The temperature of the sample is maintained in substantial dynamic equilibrium with the temperature of the reference material by the calorimeter. The ramp signal may exhibit nonlinearities, such as steps, rather than being a continuously variable signal. Since the measured output of the calorimeter is the differential power needed to maintain dynamic equilibrium, the output exhibits ripples due to such nonlinearities. The measured output is an analog output and includes peak components as well as a baseline component that exhibits ripple at low frequencies of scanning. The ramp signal is linearized by filtering out the ripple by a low pass filter and by compensating for any lag introduced into the ramp signal by the filter by adding a step voltage to the ramp signal.

5 Claims, 6 Drawing Figures

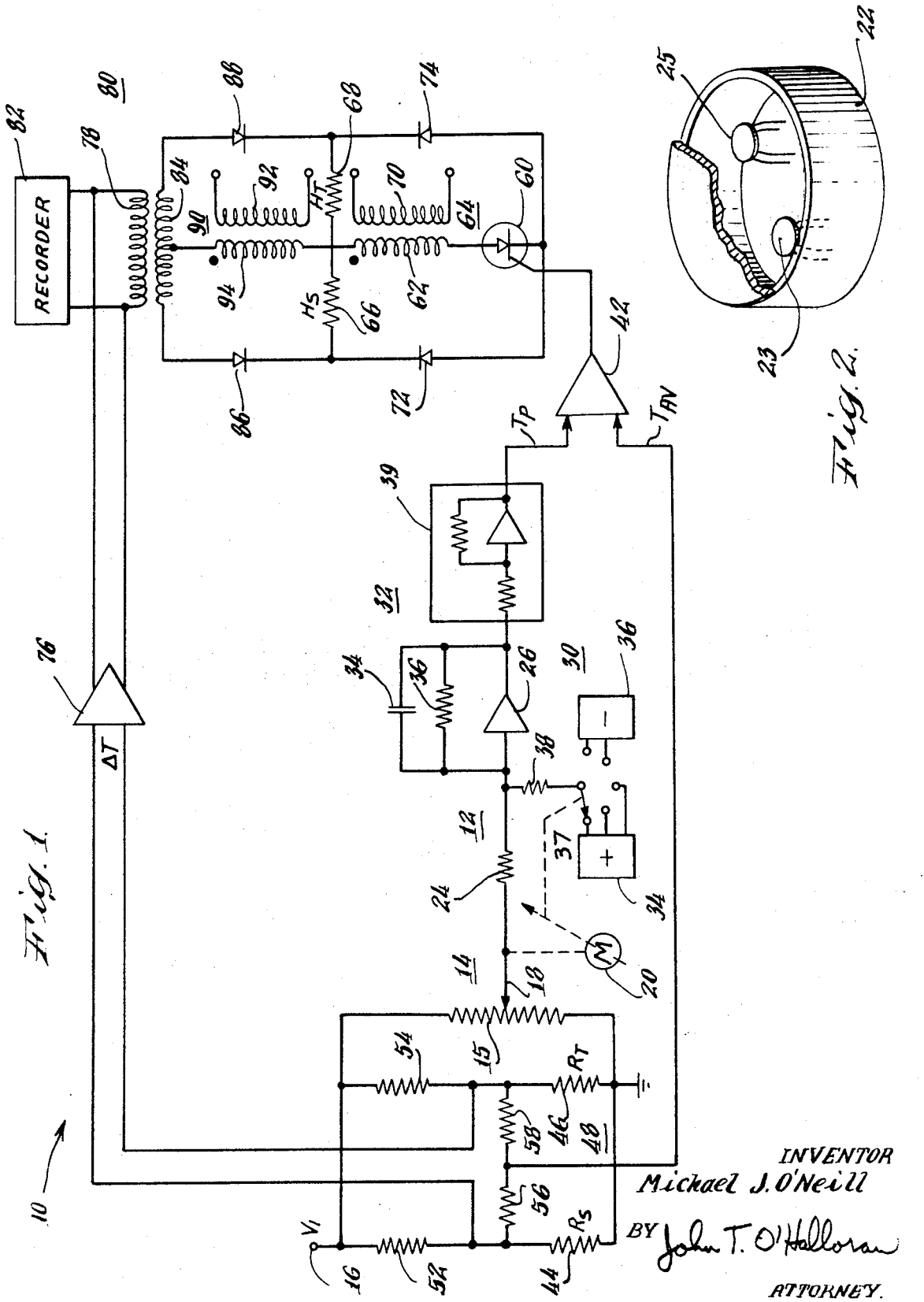

LINEARIZING CIRCUIT FOR A RAMP GENERATOR IN A DIFFERENTIAL SCANNING CALORIMETER

BACKGROUND OF THE INVENTION

Thermal analysis of materials is based on the fact that thermal energy is absorbed or evolved during physical or chemical changes in the material. A differential scanning calorimeter is a thermal analytical instrument that measures directly the differential energy changes that occur in the sample during such reactions, as a function of time or temperature. In such instruments, a sample material and a thermally inert reference material are placed in the same thermal environment and the environment is subjected to a programmed change in its temperature. The absorption or evolution of thermal energy by the sample during such programmed changes tends to cause its temperature to momentarily lag or lead the temperature of the reference material. However the temperature of the sample is maintained in dynamic equilibrium with the temperature of the reference by means of a feedback loop that controls the energy supplied to both the sample and reference materials. An analog measurement of the energy required to maintain such a dynamic equilibrium is recorded and provides the output of the calorimeter.

The source of the thermal energy supplied to the sample and reference material is electrical energy as transduced by means of resistors into thermal energy. The electrical energy is programmed to increase or decrease throughout a desired range to effectively provide a temperature scanning of the materials. Thus the thermal energy supplied is directly proportional to the electrical energy and the rate at which the electrical energy is increased or or decreased controls the differential heat flow rate.

It is desirable that the electrical energy supplied be derived from a ramp signal that exhibits a linear change. The ramp signal may, for example, be derived from a potentiometer or the like. Such ramp signals tend to increase and decrease in steps, rather than continuously. This is because the windings on a potentiometer are a discrete distance apart from each other. Furthermore the steps in the output ramp signal may be unequal due to irregular spacing of the resistance windings in the potentiometer. Such steps in the ramp signal in turn cause a baseline ripple in the differential heat energy transfer measured by the calorimeter, and particularly at low scanning rates. Such a baseline ripple effectively limits the range of operation of the calorimeter and prohibits the use of very small sample material since the measured differential heat from such a small sample may be on the same order of magnitude of amplitude as the baseline ripple.

SUMMARY OF THE INVENTION

A linearizing circuit for a ramp signal generator in a differential scanning calorimeter linearizes the output signal of the generator. A low pass filter is coupled to the ramp signal generator to filter out nonlinearities in the ramp signal, and means are provided for producing any one of a plurality of step functions for adding to the ramp signal to compensate for any lag introduced into the ramp signal by the filter.

DESCRIPTION OF THE DRAWINGS

FIG. 1 is a schematic block diagram of a differential scanning calorimeter that includes a linearizing circuit embodying the invention;

FIG. 2 is a partially broken enclosure for sample and reference material that is utilized in the calorimeter of FIG. 1;

DETAILED DESCRIPTION

Figure 4:
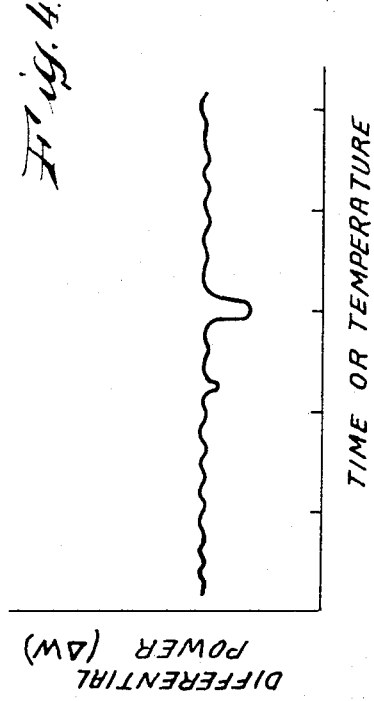
FIG. 4 is a graphic illustration of the differential energy output as measured at the calorimeter.

Referring to FIG. 1, a differential scanning calorimeter 10 includes an improved ramp signal generator 12 that incorporates a potentiometer 14 that is coupled between the output terminal 16 of a power supply $V_1$ and a point of reference potential, or ground, in the circuit. The potentiometer 14 includes a wire wound resistive element 15, shown schematically in FIG. 1, as well as a wiper arm 18. The wiper arm 18 is moved under the control of a motor 20 at a programmed rate from one extremity to the other of the resistive element. The programmed rate produces a ramp signal output that effectively provides a setpoint temperature scanning range for heating sample and reference materials contained in a material oven or enclosure 22, as shown in FIG. 2.

The wiper arm 18 of the potentiometer is coupled through a resistor 24 to the input of an inverting operational amplifier 26. The ramp signal derived from the potentiometer 14 exhibits nonlinearities due to unequal and discrete spacings between individual turns of the resistance wire in the potentiometer 14 and hence is not a continuously varying signal. Such nonlinearities introduce a ripple into the ramp signal produced by the potentiometer 14.

A linearizing circuit 30 is incorporated into the differential scanning calorimeter 10 to provide a linearized ramp signal. The linearizing circuit 30 includes a filter 32 that includes the parallel combination of a capacitor 34 and a resistor 36 coupled across the inverting amplifier 26 from the input to the output thereof.

The filter 32, in filtering out the high frequency ripple in the ramp signal produced by the potentiometer 14, may introduce a lag into the ramp signal. A step signal is utilized in the linearizing circuit 30 to compensate for this lag. Any one of a plurality of step signals are derived from a pair of step signal generators 34 and 36. The step signal generator 34 produces any one of a plurality of positive going step signals. A selected one of the step signals is added to the ramp signal when the potentiometer 14 is programmed to produce a positive going ramp signal of a predetermined rate. The step signal generator 34 includes a switch 37 that is ganged to the speed controller of the motor 20 to provide a different step signal when the motor 20 is programmed to drive the wiper arm 18 at a different rate. Thus the motor 20 and the switch 37 are carefully synchronized with each other to provide corresponding ramp and step signals. The step signal generator 36 provides any one of a plurality of negative going step signals, a selected one of which is added to the ramp signal when the potentiometer 18 is programmed to provide a negative going ramp signal. The switch 37 selects different negative going step signals as different negative going ramp signals are provided by the motor programming controls. The step signals are applied through a resistor 38 to the input of the summing amplifier 26 to be added to the ramp signal.

The output of the amplifier 26 is inverted in an analog inverter 39. The output of the inverter 39 provides a signal defining a setpoint temperature $T_p$ which is applied to one input of a difference amplifier 42. The other input to the amplifier 42 is a signal $T_{av}$ that denotes the average of the temperatures in the sample and the reference materials in the enclosure 22. The average signal is derived from heat sensing resistors 44 and 46 that are connected in a Wheatstone bridge circuit 48. The resistor 44 is a heat sensor ($R_s$) that is incorporated on the sample holder 25, shown in FIG. 2, to detect the temperature of the sample material placed on the holder 25. Similarly the resistor 46 comprises a heat sensor ($R_T$) for the reference material incorporated on the holder 23, shown in FIG. 2. The heat sensors 44 and 46 comprise two arms of the bridge circuit 48 that is connected between the terminal 16 of the power supply and ground. The other two arms of the bridge circuit 48 comprise resistors 52 and 54. A pair of averaging resistors 56 and 58 are coupled to the midpoint of the arms of the bridge circuit 48 and the average signal $T_{av}$ is derived from the junction of the resistors 56 and 58.

Figure 3:
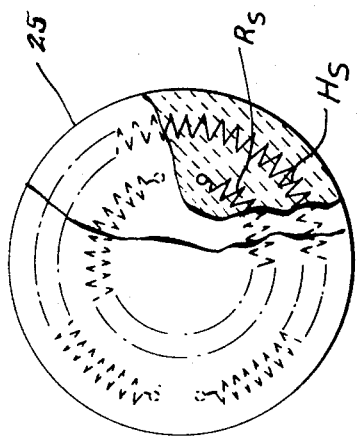
FIG. 3 is a plan view of a sample holder.

The output of the difference amplifier 42 is coupled to control the firing of a silicon controlled rectifier 60. The silicon controlled rectifier 60 controls the amount of electrical power applied from the secondary winding 62 of a transformer 64 to heaters 66 and 68. The heater 66 ($H_s$) comprises the heating element to heat the sample on the sample holder 25, as shown in FIG. 3. The heating element 68 ($H_T$) comprises the heating element to heat the reference material on the reference holder 23. The primary winding 70 of the transformer 64 is coupled to an alternating current electric power source, not shown. The current derived from the transformer 64 is applied to the heater 66 through a diode 72 and to the heater 68 through a diode 74.

The differential heating of the sample and reference material is detected by coupling a difference amplifier 76 to the midpoint of the bridge circuit 48. The output of the amplifier 76 is coupled to the primary winding 78 of a differential transformer 80. The primary winding 78 is also coupled to a recorder circuit 82 that produces an output analog graphical record, shown in FIG. 4, of the differential heat power ($\Delta W$) required to maintain dynamic equilibrium between the temperatures of the sample and reference materials. The secondary winding 84 of the differential transformer 80 is therefore coupled to apply the differential signal to the heating elements 66 and 68 of the sample and reference materials respectively. It is to be noted that not only is there a differential sensing in the calorimeter 10 but there is also a differential correction in that the differential signal is applied differentially to the heating elements 66 and 68. To accomplish this one terminal of the secondary winding 84 of the differential transformer 80 is coupled through a diode 86 to the sample heating element 66 whereas the other terminal of the secondary 84 is coupled through a diode 88 to the reference heating element 68. A biasing transformer 90 is incorporated in the calorimeter 10 to apply a biasing signal to the heaters 66 and 68. The primary winding 92 of the transformer 90 is coupled to a source of alternating current power, not shown, and the secondary winding 94 of this transformer is coupled between the midpoint of the secondary winding 84 of the differential transformer 80 and the junction of the heating elements 66 and 68. The main transformer 64 and the baising transformer 90 are connected such that the dotted terminals shown in FIG. 1 exhibit the same polarity.

The differential scanning calorimeter 10 has been described in more detail in U.S. Pat. No. 3,263,484 which is assigned to the same assignee as the present application. This patent is incorporated by reference into this disclosure.

OPERATION

In operating the differential scanning calorimeter 10 a user places a reference material on the reference holder 23, shown in FIG. 2, and a sample material on the sample holder 25, also shown in this figure. The enclosure 22 is then heated to temperature scan the sample and reference materials throughout a desired range. The temperature scanning is accomplished by sending electrical power through the heating elements 66 and 68 which transduces the electrical energy into thermal energy to accomplish the heating. To provide a programmed increase in temperature, the potentiometer 14 is operated to produce a ramp signal that causes the silicon controlled rectifier 60 to fire to send current through the heaters 66 and 68 at a desired rate. The average temperature of the sample and reference materials is also detected and applied to the difference amplifier 42 to insure that the scanning setpoint temperature $T_p$ is being produced in the holders 23 and 25.

Physical and chemical changes in the sample material cause absorption and evolution of heat energy that tend to make the sample lag and lead the temperature of the reference material. This produces an unbalance in the bridge circuit 48, which is detected by the difference amplifier 76 to produce a differential signal that is applied to the differential transformer 80. The differential signal derived from the secondary winding 84 of the transformer 80 tends to add to the biasing signal produced by the transformer 90 for one of the heaters 66 or 68 and subtracts from the biasing signal applied to the other heater. Consequently differential power is applied to maintain the temperatures of the sample and reference materials in dynamic equilibrium.

An unlinearized ramp signal tends to produce a baseline ripple in the baseline component of the differential ($\Delta W$) curve shown in FIG. 4 at low scanning rates. This is because the differential ($\Delta W$) signal is an analog quantity that is directly proportional to the program rate. Consequently the ramp signal produced should ideally be a linearized signal, as shown by the curve 200 in FIG. 5.

It is to be noted that the baseline ripple in FIG. 4 is effectively noise. Such noise prohibits the analysis of small samples because such samples may exhibit very small peaks during physical and chemical changes that would be indistinguishable from the noise peaks. The improving of the signal-to-noise ratio of the calorimeter 10 also permits operation at much greater temperature ranges and scanning rates.

The nonlinearities or ripple is removed from the ramp signal and consequently from the baseline of the differential ($\Delta W$) signal by incorporating the low pass filter 32 into the linearizing circuit 30. However, such a low pass filter, while removing the ripple, tends to cause a lag in the ramp signal for one programming speed, as shown by the curve 102 in FIG. 5. At greater programming speeds a greater lag is introduced as shown by the dotted curve 104 in FIG. 5. This is apparent from the fact that $\Delta V = (dV)/dt Y$, where Y is the time constant of the filter 32.

Such a phenomenon tends to make the actual temperatures of the sample and reference materials lag considerably the setpoint temperature. The output recorder 82 can be calibrated to remove the lag at one scanning rate, but where the scanning rates are varied, such calibrations place an onerous burden on the operator of the calorimeter 10. The differential scanning calorimeter 10 includes step function generators 34 and 36 to remove this lag. The step function produced by the generator 34 may for example be similar to the curve 105 shown in FIG. 6. The steady-state amplitude of the step signal 105 is selected to equal the differential voltage $\Delta V$ between the ramp signals 100 and 102 to compensate exactly for the lag. The filter 32 filters the step signal 105 to produce the signal 106, shown dotted in FIG. 6. The addition of such a step signal in the summing amplifier 26 to the ramp signal 102 of FIG. 5 produces substantially linearized signal 100.

Figure 6:
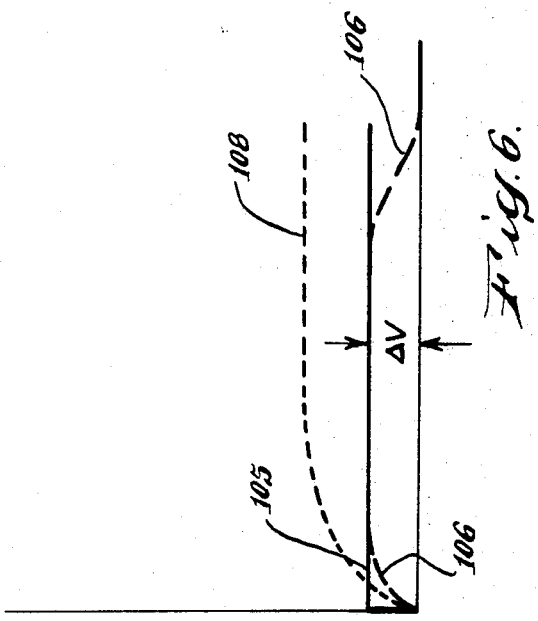
FIG. 6 is a graphical representation of step signals added to the ramp signal of FIG. 5.
Figure 5:
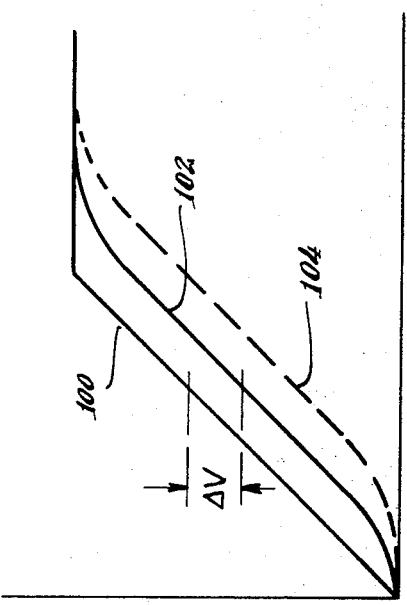
FIG. 5 is a graphical representation of ideal and uncorrected ramp signals.

The greater programming rate that produces the ramp signal similar to the curve 104 in FIG. 5, requires a greater compensating step signal, similar to that shown by the dotted curve 108 in FIG. 6. Therefore when the programming rate of the motor 20 is varied, the gang switch 37 is also varied to produce different step function signals. Similarly, negative going ramp signals are compensated for by negative going step function signals derived from the generator 36.

Although the linearizing circuit 30 has been described as compensating for ramp signals derived from the potentiometer 14, it is apparent that the circuit 30 also compensates for signals derived from other ramp signal generators. Another such generator may, for example, comprise a variable pulse generator and digital-to-analog converter combination.

Thus in accordance with the invention a linearizing circuit is provided for a ramp generator in a differential scanning calorimeter to remove baseline ripple that occurs in the recorded output of the calorimeter.

I claim:
1. In a differential scanning calorimeter which includes a ramp signal generator connected to apply electric power for defining a scanning range of setpoint signals $T_p$ that is proportional to a range of setpoint temperatures to which a sample and a reference material are heated, means producing a signal $T_{av}$ that is proportional to the average of the temperatures of said sample and said reference material, means to compare the signals $T_p$ and $T_{av}$ and means to control amounts of heat applied to the sample and reference material in response to a difference between the signals $T_p$ and $T_{av}$, the improvement comprising, an electrical filter coupled to filter out nonlinearities in signals from said ramp signal generator, means for producing a plurality of step signals, and means for selectively coupling one of said step signals to said filter for adding to the signal from the ramp signal generator a one of said step signals selected to compensate for any lag produced in the ramp generator signal by said filter.

2. The calorimeter of claim 1 in which said means for producing a plurality of step signals comprises a pair of step signal generators, one of which produces a plurality of positive going step signals and the other of which produces a plurality of negative going step signals.

3. The calorimeter of claim 1 in which said ramp signal generator comprises a potentiometer having a wiper arm movable relatively along a wire wound resistive element at a selected rate by a motor, and including switch means ganged to said motor for sequentially coupling successive ones of said step signals to said filter in timed relation with the motor controlled movement of said wiper arm along said resistive element.

4. The calorimeter of claim 1 in which said electrical filter is a low pass filter including an inverting operational amplifier and a parallel combination of a capacitor and a resistor coupled from the input to the output of said amplifier.

5. The calorimeter of claim 4 which includes an analog inverter connected between the output of said amplifier and said means for comparing the signals $T_p$ and $T_{av}$.

* * * * *